Nov. 20, 1945.  W. LOEWENSTERN  2,389,524
CHLORINATING APPARATUS
Filed Feb. 2, 1944
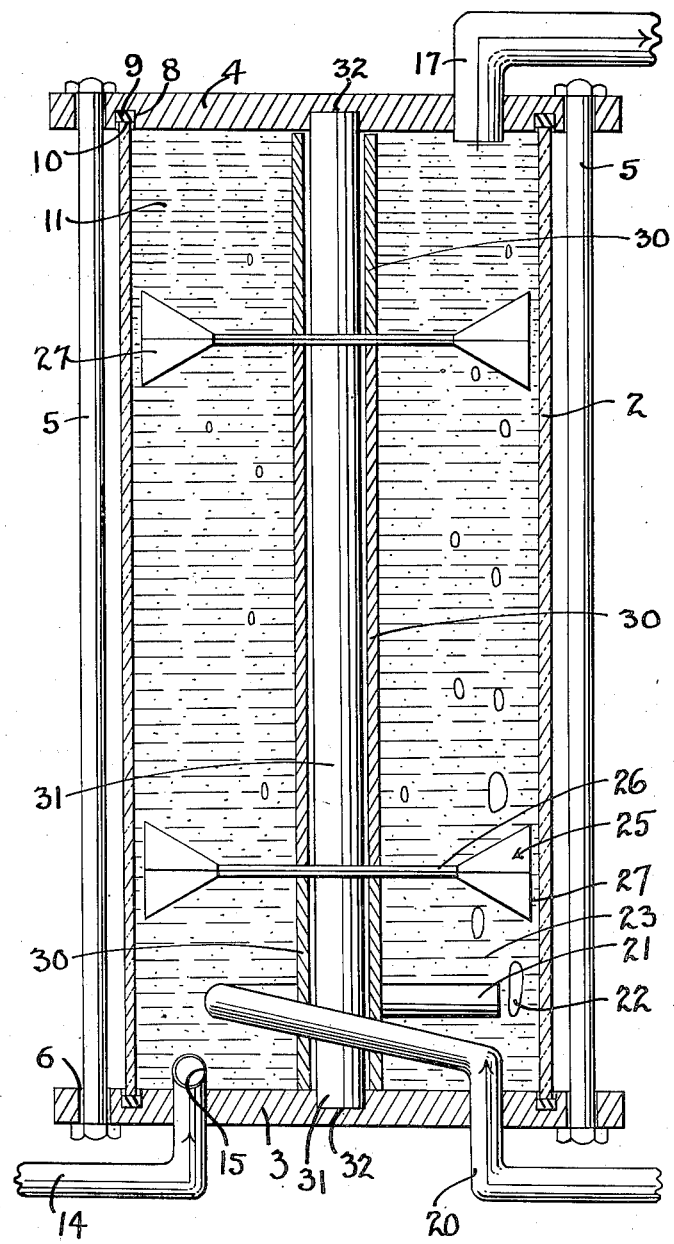
INVENTOR.
WALTER LOEWENSTERN.
BY
Lester B. Clark.
ATTORNEY

UNITED STATES PATENT OFFICE 2,389,524

CHLORINATING APPARATUS

Walter Loewenstern, Houston, Tex., assignor to Houston Oxygen Company, Houston, Tex., a corporation Application February 2, 1944, Serial No. 520,817

1 Claim. (Cl. 261—93)

The invention relates to a device for chlorinating water so as to obtain an intimate mixture of the water and chlorine gas which will result in a solution of the gas in the water in order to prevent the formation of algae and other growths in circulating systems.

It is one of the objects of the invention to provide a chlorinating device wherein the water passing through the device is agitated by rotatable impellers so as to obtain an intimate association of chlorine gas and water.

Another object of the invention is to introduce chlorine gas into a flowing stream of water so that the gas will be dissolved in the water due to agitation by impellers movable by the flow of water.

Another object of the invention is to provide a chlorinating device having a transparent body portion so that the operation thereof may be visible and in which a means is provided for intimately associating the chlorine gas and a flowing stream of water.

Another object of the invention is to provide a chlorinating device comprising a transparent cylinder having end plates clamped thereon which serve to support the inlets and the outlets from the chamber formed thereby and to additionally support an agitating means.

Other and further objects of the invention will be readily apparent when the following description is considered in connection with the accompanying drawing wherein the figure is a vertical sectional view illustrating the arrangement, assembly and construction of the parts.

The chlorinating device generally is illustrated in the drawing and is composed of a transparent cylinder 2 of glass or other suitable material to which the base plate 3 and the cap plate 4 are clamped by means of a plurality of rods or bolts 5 which pass through the openings 6 in the plates.

Each of the plates is provided with a recess 8 which carries a packing or sealing ring 9 to receive the end 10 of the glass cylinder whereby the mixing chamber 11 is formed.

A water inlet 14 enters through the base plate 3 and has the discharge end 15 thereof disposed in a circumferential direction so that the water discharging into the chamber 11 will tend to rotate as it moves upwardly in the chamber. The outlet 17 leads from the cap plate 4 and is arranged to discharge the water from the device.

A chlorine gas inlet pipe 20 also enters through the base plate and preferably has a curved extension 21 thereon which extends in a circumferential direction so as to discharge the bubbles 22 of gas into the flowing stream 23 of water. These bubbles will be carried along with the stream of water which travels circularly around the inside of the cylinder 2.

In order to assist in the agitation of the water and the solution of the chlorine gas in the water one or more series of impeller blades may be provided. Those shown are in the nature of a flat plate 26 having portions thereof which have been cut and folded to provide the vertically arranged blade portions 27 against which the circulating water will impinge and tend to disrupt the uniform flow of the water so as to effect additional agitation thereof.

These impellers are supported upon the spacer sleeves 30 which may be of any suitable material which is not subjected to corrosion by the water and chlorine and which can be dropped over the center shaft 31 which is supported in the recesses 32 in the cap and base plates. There are three of these spacer sleeves 30 illustrated as supporting the two series of impeller blades.

In operation the water will be turned into the pipe 14 so as to discharge into the chamber 11 and escape from the outlet 17. The flow of chlorine gas through the pipe 20 can obviously be controlled by any suitable type of control valve (not shown) which can be placed upon the pipe 20. It seems obvious that any suitable type of valve can be provided so that by adjustment of the valve the amount of gas discharging into the cylinder can be determined, or if desired, by observing the bubbles 22 issuing from the end 21 of the pipe. It will be noted that the bubbles become smaller and smaller as they move upwardly in the chamber due to the fact that the gas is being taken into solution in the water.

Broadly the invention contemplates a simple and economical chlorinating device wherein the flow of the water facilitates the agitation thereof and the mixing of the gas.

What is claimed is:

A chlorinating device including a frame made up of end plates and a cylindrical transparent cylinder, a sealing groove containing sealing material in each end plate to receive said cylinder ends, means to clamp the ends together to provide a mixing chamber within said cylinder, water inlet and outlet means carried by said end plates, a shaft clamped between said plates, loosely slidable and rotatable spacer sleeves about said shaft, freely rotatable impeller mixers spaced by said spacers to rotate due to the flow of water thereby, and means for introducing chlorine gas adjacent the base of said chamber in a tangential direction to mix with and be circulated by the incoming water.

WALTER LOEWENSTERN.